(12) United States Patent
Dey et al.

(10) Patent No.: US 11,810,113 B2
(45) Date of Patent: Nov. 7, 2023

(54) METHOD AND SYSTEM FOR FEDERATED VIRTUAL CARD

(71) Applicant: Visa International Service Association, San Francisco, CA (US)

(72) Inventors: Akon Samir Dey, Foster City, CA (US); Kingdom Nwachi Iweajunwa, Cedar Park, TX (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/488,039

(22) Filed: Sep. 28, 2021

(65) Prior Publication Data

US 2023/0102161 A1 Mar. 30, 2023

(51) Int. Cl.
*G06Q 20/40* (2012.01)
*G06Q 20/34* (2012.01)

(52) U.S. Cl.
CPC ......... *G06Q 20/401* (2013.01); *G06Q 20/351* (2013.01)

(58) Field of Classification Search
CPC .......................... G06Q 20/401; G06Q 20/351
See application file for complete search history.

(56) References Cited

U.S. PATENT DOCUMENTS

| | | | | |
|---|---|---|---|---|
| 9,595,023 | B1* | 3/2017 | Hockey | G06Q 20/3223 |
| 11,423,395 | B1* | 8/2022 | Kurani | G06Q 20/3676 |
| 2014/0222663 | A1* | 8/2014 | Park | G06Q 20/027 |
| | | | | 705/39 |
| 2016/0132867 | A1* | 5/2016 | Raja | G06Q 20/22 |
| | | | | 705/16 |
| 2020/0065783 | A1* | 2/2020 | Fernandes | G06Q 20/20 |
| 2020/0258072 | A1* | 8/2020 | Unnerstall | G06Q 20/40145 |
| 2020/0387895 | A1* | 12/2020 | Shakkarwar | G06Q 20/322 |
| 2021/0233088 | A1* | 7/2021 | Mehrotra | G06Q 20/22 |

OTHER PUBLICATIONS

"Tokenization," dated 2008, Stanford, https://nlp.stanford.edu/IR-book/html/htmledition/tokenization-1.html (Year: 2008).*
"A method for implementing 'Split bill' e-payment" dated May 30, 2006, IP.com (Year: 2006).*
Saba Eskandarian, "Privacy-Preserving Payment Splitting," ARVIX, dated Nov. 20, 2019 https://arxiv.org/pdf/1911.09222.pdf (Year: 2019).*

* cited by examiner

*Primary Examiner* — Gregory S Cunningham, II
*Assistant Examiner* — Raven E Yono
(74) *Attorney, Agent, or Firm* — Kilpatrick Townsend & Stockton LLP (57) ABSTRACT

Embodiments provide methods and systems for associating a single token with multiple accounts of a user, and enabling the user to define rules for processing transactions using the token. A Federated Virtual Card (FVC) may be provisioned on a digital wallet of a user device through a token associated with the FVC. Transactions conducted using the FVC may be divided among the two or more user accounts based on user-defined rules. An account (e.g. card) may be added to or removed from the FVC without disrupting the cardholder's ability to use the card to transact outside the FVC. A mobile application or an online platform may be provided for managing the FVC.

17 Claims, 4 Drawing Sheets

METHOD AND SYSTEM FOR FEDERATED VIRTUAL CARD

CROSS-REFERENCES TO RELATED APPLICATIONS

None.

BACKGROUND

In conventional systems, a virtual card or a payment token has a strict one to one relationship to a payment card. A token can be associated with a single card only at any one time while multiple tokens can be associated with a single card. This limitation has several drawbacks, such as not being able to use multiple cards for an online transaction. A card holder may want to combine the credit limits across multiple cards to make a purchase (e.g. a transaction with a high transaction amount). Conventional systems require determining the charge to be applied to each card, and running the partial transaction on each card individually. Not only this approach is time consuming and rudimentary, it also results in sensitive information associated with multiple accounts to be presented, and therefore made available for potential fraud and identity theft in case the sensitive information gets compromised. In addition, such systems do not allow for a single point of control to disable use of multiple cards.

Embodiments address these and other problems individually and collectively.

BRIEF SUMMARY

Embodiments provide methods and systems for associating a single token with multiple accounts of a user, and enabling the user to define one or more rules for processing transactions using the token.

A method is disclosed. The method comprises acquiring, by a server computer, credentials associated with a plurality of accounts of a user; generating, by the server computer, a virtual card having a virtual card identifier; determining, by the server computer, a token associated with the virtual card, wherein the token acts as a proxy for the virtual card identifier; provisioning, by the server computer, the virtual card on a user device of the user; storing, by the server computer, a passive association between the token and the plurality of accounts of the user at a database; providing, by the server computer, a list of the plurality of accounts of the user that are eligible to be associated with the virtual card; receiving, by the server computer, a first selection of two or more of the plurality of accounts and a first rule set from the user; storing, by the server computer, an active association of the two or more of the plurality of accounts identified in the first selection and the virtual card along with the first rule set as a first entry on the database; receiving, by the server computer, an authorization request message associated with a first transaction including credentials associated with the virtual card; and processing, by the server computer, the first transaction using the two or more of the plurality of accounts identified in the first selection and the first rule set.

Another embodiment is directed to a server computer configured or programmed to acquire credentials associated with a plurality of accounts of a user; generate a virtual card having a virtual card identifier; determine a token associated with the virtual card, wherein the token acts as a proxy for the virtual card identifier; provision the virtual card on a user device of the user; store a passive association between the token and the plurality of accounts of the user at a database; provide a list of the plurality of accounts of the user that are eligible to be associated with the virtual card; receive a first selection of two or more of the plurality of accounts and a first rule set from the user; store an active association of the two or more of the plurality of accounts identified in the first selection and the virtual card along with the first rule set as a first entry on the database; receive an authorization request message associated with a first transaction including credentials associated with the virtual card; and process the first transaction using the two or more of the plurality of accounts identified in the first selection and the first rule set.

Further details regarding embodiments can be found in the Detailed Description and the Figures.

DETAILED DESCRIPTION

Prior to discussing embodiments, some terms can be described in further detail.

A "user" may include an individual or a computational device. In some embodiments, a user may be associated with one or more personal accounts, user devices and/or mobile devices. In some embodiments, the user may be a cardholder, account holder, or consumer.

A "resource provider" may be an entity that can provide a resource such as goods, services, information, and/or access. Examples of resource providers includes merchants, data providers, transit agencies, governmental entities, venue and dwelling operators, etc.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

A "transaction processing network" may include a network for processing transaction (e.g. a payment transaction). A transaction processing network may include data processing subsystems, networks, server computers and operations used to support and deliver authorization services, exception file services, and clearing and settlement services. The transaction processing network may be any suitable network able to transmit and receive financial system transaction messages (e.g., ISO 8583 messages), and process transactions. An exemplary transaction processing system may include VISANET. Payment processing systems such as VISANET are able to process credit card transactions, debit card transactions, and other types of commercial transactions.

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g., POS equipment) that indicates approval of the transaction. The code may serve as proof of authorization. As noted above, in some embodiments, a payment processing network may generate or forward the authorization response message to the merchant.

A "user device" may comprise any suitable electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of user devices include mobile phones (e.g. cellular phones), PDAs, tablet computers, net books, laptop computers, personal music players, hand-held specialized readers, etc. Further examples of user devices include wearable devices, such as smart watches, fitness bands, ankle bracelets, rings, earrings, etc., as well as automobiles with remote communication capabilities. A user device may comprise any suitable hardware and software for performing such functions, and may also include multiple devices or components (e.g. when a device has remote access to a network by tethering to another device—i.e. using the other device as a modem—both devices taken together may be considered a single mobile device).

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a user name, an expiration date, a gift card number or code, and any other suitable information.

An "application" may be computer code or other data stored on a computer readable medium (e.g. memory element or secure element) that may be executable by a processor to complete a task.

A "digital wallet" can include an electronic device that allows an individual to conduct electronic commerce transactions. A digital wallet may store user profile information, payment credentials, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may be designed to streamline the purchase and payment process. A digital wallet may allow the user to load one or more payment cards onto the digital wallet so as to make a payment without having to enter an account number or present a physical card.

A "digital wallet provider" may include an entity, such as an issuing bank or third party service provider, that issues a digital wallet to a user that enables the user to conduct financial transactions. A digital wallet provider may provide standalone user-facing software applications that store account numbers, or representations of the account numbers (e.g., payment tokens), on behalf of a cardholder (or other user) to facilitate payments at more than one unrelated merchant, perform person-to-person payments, or load financial value into the digital wallet. A digital wallet provider may enable a user to access its account via a personal computer, mobile device or access device. Additionally, a digital wallet provider may also provide one or more of the following functions: storing multiple payment cards and other payment products on behalf of a user, storing other information including billing address, shipping addresses, and transaction history, initiating a transaction by one or more methods, such as providing a user name and password, NFC or a physical token, and may facilitate pass-through or two-step transactions.

A "token" may be a substitute value for a credential. A token may be a string of numbers, letters, or any other suitable characters. Examples of tokens include payment tokens, access tokens, personal identification tokens, etc. For example, a payment token may include an identifier for a payment account that is a substitute for an account identifier, such as a primary account number (PAN) or a virtual access credential. For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a transaction or represent the original credential in other systems where the original credential would typically be provided. In some embodiments, a token value may be generated such that the recovery of the original PAN, other account identifier, or virtual access credential from the token value may not be computationally derived. Further, in some embodiments, the token format may be configured to allow the entity receiving the token to identify it as a token and recognize the entity that issued the token.

A "token provider" or "token service system" can include a system that that services tokens. In some embodiments, a token service system can facilitate requesting, determining (e.g., generating) and/or issuing tokens, as well as maintaining an established mapping of tokens to primary account numbers (PANs) in a repository (e.g. token vault). In some embodiments, the token service system may establish a token assurance level for a given token to indicate the confidence level of the token to PAN binding. The token service system may include or be in communication with a token vault where the generated tokens are stored. The token service system may support token processing of transactions submitted using tokens by de-tokenizing the token to obtain the actual PAN. In some embodiments, a token service system may include a tokenization computer alone, or in combination with other computers such as a transaction processing system.

A "token vault" can include a repository that maintains established token-to-PAN mappings. According to various embodiments, the token vault may also maintain other attributes of a token requester that may be determined at the time of registration and that may be used by the token service provider to apply domain restrictions or other controls during transaction processing. In some embodiments, the token vault may be provided as a part of the token service provider. Alternatively, the token vault may be a remote repository accessible by the token service provider. The token vault, due to the sensitive nature of the data mappings that are stored and managed in it, may be protected by strong underlying physical and logical security.

A "token request message" may be an electronic message for requesting a token. A token request message may include information usable for identifying an account or digital wallet, and/or information for generating a token. For example, a token request message may include credentials, mobile device identification information (e.g. a phone number or MSISDN), a digital wallet identifier, information identifying a tokenization service provider, a merchant identifier, a cryptogram, and/or any other suitable information. Information included in a token request message can be encrypted (e.g., with an issuer-specific key). In some embodiments, a token request message may be formatted as an authorization request message (e.g., an ISO 8583 message format). In some embodiments, the token request message may include a flag or other indicator specifying that the message is a token request message.

A "token response message" may be a message that responds to a token request. A token response message may include an indication that a token request was approved or denied. A token response message may also include a token, mobile device identification information (e.g., a phone number or MSISDN), a digital wallet identifier, information identifying a tokenization service provider, a merchant identifier, a cryptogram, and/or any other suitable information. Information included in a token response message can be encrypted (e.g., with an issuer-specific key). In some embodiments, a token response message may be formatted as an authorization response message (e.g., an ISO 8583 message format). In some embodiments, the token response message may include a flag or other indicator specifying that the message is a token response message.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Embodiments provide systems and methods for associating a single token with multiple accounts of a user, and enabling the user to define one or more rules for processing transactions using the token. According to various embodiments, a Federated Virtual Card (FVC) is provided as a virtual card associated with multiple user accounts (e.g. associated with one or more physical cards) that may be issued by different issuers across one or more transaction processing networks. The FVC may be provisioned on a digital wallet of a user device through a token associated with the FVC. When the token is provisioned on the digital wallet, the token may be associated with a plurality of user-selected accounts (e.g. user cards). According to various embodiments, a transaction conducted using the FVC (or the FVC token) may be divided among the two or more user accounts based on one or more user-defined rules. An account (e.g. card) may be added to or removed from the FVC without disrupting the card holder's ability to use the card to transact outside the FVC. Embodiments provide a mobile application or an online platform for managing the FVC (e.g. defining rules and selecting cards associated with the FVC). Using the mobile application or the online platform, the card holder can organize their accounts (e.g. physical cards) into one or more FVCs. According to various embodiments, a transaction using the FVC may be authorized when the charge on all the accounts (e.g. user cards) involved in the federated transaction are authorized. Any decline on a federating transaction, may result in the transaction to be declined. These and other features will be described below in greater detail.

Figure 1:
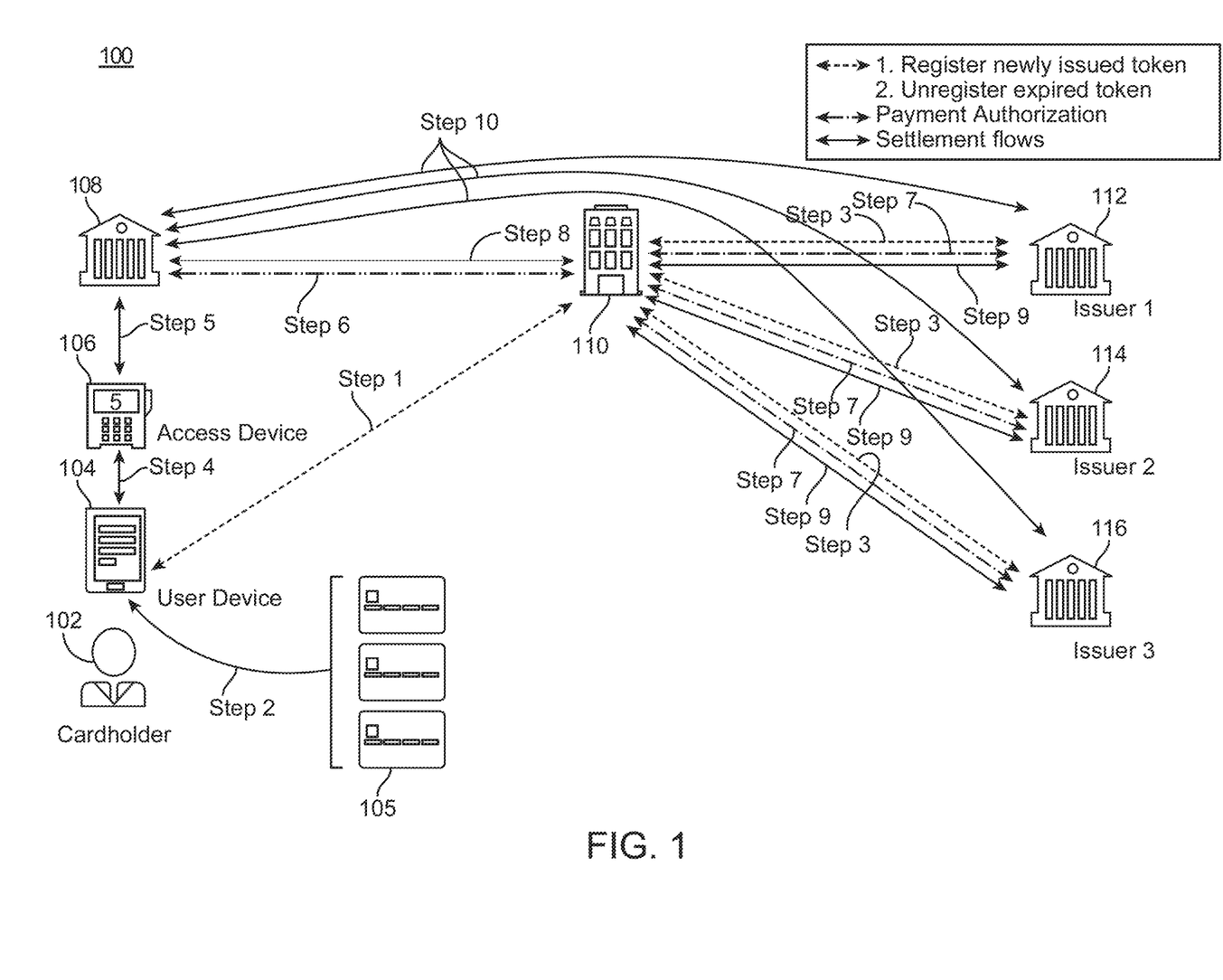
FIG. 1 shows a block diagram of a system for provisioning and using a Federated Virtual Card (FVC) on a user device, according to various embodiments.

FIG. 1 shows a system 100 for provisioning and using a Federated Virtual Card (FVC) on a user device according to various embodiments. The system 100 comprises a user (e.g. cardholder, account holder) 102, a user device 104, an access device (e.g. a transaction terminal, a point of sale (POS) terminal, a resource provider website, a resource provider mobile app) 106, a transport computer (e.g. an acquirer computer) 108, a transaction processing network computer 110, and a plurality of authorizing entity computers 112, 114, 116. The user device 104 can be in operative communication with the access device 106. The access device 106 can be in operative communication with the transport computer 108. The transport computer 108 can be in operative communication with the transaction processing network computer 110. The transaction processing network computer 110 can be in operative communication with the authorizing entity computers 112, 114, 116.

For simplicity of illustration, a certain number of components are shown in FIG. 1. It is understood, however, that embodiments may include more than one of each component. In addition, some embodiments may include fewer than or greater than all of the components shown in FIG. 1.

Messages between at least the devices in FIG. 1 can be transmitted using a secure communications protocols such as, but not limited to, File Transfer Protocol (FTP); Hyper-Text Transfer Protocol (HTTP); Secure Hypertext Transfer Protocol (HTTPS), SSL, ISO (e.g., ISO 8583) and/or the like. The communications network may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The user device 104 can include any suitable device operable by a user. The user device 104 can be a smart phone, a smart watch, a tablet, a laptop computer, a desktop computer, etc. The user device 104 may be able to receive communications from and send communications to the access device 106.

The access device 106 can include a device that provides access to a remote system or access to goods or services provided by a resource provider. The access device 106 may be able to communicate with the user device 104 and the transport computer 108. The access device can be a POS terminal, a cellular phone, a PDA, a personal computer, a tablet, a hand-held specialized reader, a set-top box, an electronic cash register, a vending machine, an automated teller machine, a virtual cash register, a kiosk, a security system, an access system, a server computer hosting a website, a server computer providing support for a mobile app, etc. The user 102 may conduct a transaction with the resource provider. The transaction may be conducted using a Federated Virtual Card (FVC) of the user that is associated with multiple user accounts (e.g. user cards) 105 issued by two or more of the plurality of authorizing entities 112, 114, 116. The resource provider can provide the transaction data to the transport computer 108. For example, the access device 106 can generate an authorization request message, which can be provided to the transport computer 108 during the transaction for authorization of the transaction.

The transport computer 108 may be any computer for receiving and forwarding authorization messages according to embodiments. In one embodiment, the transport computer 108 may be a computer of an acquiring entity that enables a resource provider to conduct specific types of transactions. The transport computer 108 may receive the authorization request message from the access device 106 and may forward the message to the transaction processing network computer 110.

The transaction processing network computer 110 may be any computer or server computer for processing transactions according to embodiments. For example, the transaction processing network computer 110 may be a payment processing network computer. An exemplary payment processing network may include data processing subsystems, networks, and operations used to support and deliver authorization services, exception file services, and clearing and settlement services. An exemplary payment processing network may include VisaNet™. Payment processing networks such as VISANET are able to process credit card transactions, debit card transactions, and other types of commercial transactions. VISANET, in particular, includes a VIP system (Visa Integrated Payments system) which processes authorization requests and a Base II system which performs clearing and settlement services. The payment processing network may use any suitable wired or wireless network, including the Internet.

The transaction processing network computer 110 may analyze the authorization request message to determine that the message includes an account identifier (e.g. a token) associated with a FVC. The transaction processing network computer 110 may retrieve from a database account identifiers of the accounts associated with the FVC for the current transaction, along with a set of rules for processing the transaction (e.g. rules for splitting the total transaction amount among the multiple accounts according to a predetermined scheme). The transaction processing network computer 110 may then identify the authorizing entity corresponding to each identified account, generate an individual (e.g. issuer-specific) authorization request message for each account (e.g. dedicated to the associated authorizing entity), and transmit the individual authorization request messages to respective authorizing entities 112, 114, 116. Each individual authorization request message may include a portion of the transaction amount assigned to the account based on the predetermined rules (e.g. as defined by the user).

The transaction processing network computer 110 may identify the authorizing entity corresponding to each identified account. For example, the transaction processing network computer 110 may analyze an account identifier and may determine that the first six digits of the account identifier comprises an issuer identification number (IIN) specifying an authorizing entity associated with the account represented by the account identifier. In one embodiment, the authorizing entity computer 112 may be a computer of an issuing entity (such as a bank, government agency, security network, etc.) that issues credentials and/or an account card to the user. Upon determination of the authorizing entity computers 112, 114, 116, the transaction processing network computer 110 may determine an address of each authorizing entity computer 112, 114, 116, so that the individual (e.g. issuer-specific) authorization request messages can be routed to the authorizing entity computers 112, 114, 116 for authorization and settlement of the transaction.

The authorizing entity computers 112, 114, 116 may be any computer or server computer for processing transactions and determining whether or not to authorize a transaction according to embodiments. The authorizing entity computers 112, 114, 116 can be operated and/or maintained by respective authorizing entities. The authorizing entity computers 112, 114, 116 can determine whether or not to authorize a transaction when receiving the individual authorization request messages. For example, the authorizing entity computers 112, 114, 116 can determine an authorization result based on the data contained in the individual authorization request messages. For example, the data may comprise an account identifier or PAN that is associated with an availability of funds or credit that may be compared to the partial transaction amount. The authorizing entity computers 112, 114, 116 may evaluate the received data and determine an authorization result of "approve" or "decline." Each authorizing entity computer 112, 114, 116 may generate an individual (e.g. issuer-specific) authorization response message that includes the authorization result of "approve" or "decline." Upon receiving the individual authorization response messages, the transaction processing network computer 110 may aggregate the individual authorization response messages into a single authorization response message, and return the authorization response message to the resource provider via the acquirer. A clearing and settlement process occurs sometime after.

Before further describing specific systems and methods for generating and using a FVC token within the system 100, a brief description of how transaction processing may proceed in transaction infrastructure, according to some embodiments, will be provided for context.

At step 1, the user 102 may request a transaction processing network computer 110 to provision a federated virtual card (FVC) on a digital wallet of their user device 104. According to various embodiments, the transaction processing network computer 110 may acquire credentials associated with a plurality of accounts of a user. The transaction processing network computer 110 may then generate the FVC having a FVC identifier. The transaction processing network computer 110 may also determine a token associated with the FVC. The token may act as a proxy for the FVC identifier. In some embodiments, the transaction processing network computer 110 may generate the token. Alternatively, the transaction processing network computer 110 may receive the token from a token server. The transaction processing network computer 110 may store a mapping between the token and the FVC identifier at a database (e.g. a token vault). The transaction processing network computer 110 may further store a passive association between the token and the plurality of accounts of a user. The passive association may indicate that the multiple accounts are eligible to be selected by the user for an active association with the FVC during a transaction. For example, the FVC may have a passive association with 5 accounts. The user may wish to use 3 out of 5 accounts during a particular transaction, thereby selecting the 3 accounts for an active association with the FVC. This aspect will be discussed below in greater detail. The transaction processing network computer 110 may provision (e.g. in cooperation with the digital wallet provider of the digital wallet) the token on the digital wallet of the user device.

According to various embodiments, the transaction processing network computer 110 may inform the authorizing entities 112, 114, 116 associated with each one of the multiple cards of the passive association between the FVC (or the token associated with the FVC) and the account generated by respective authorizing entities 112, 114, 116.

At step 2, the transaction processing network computer 110 may provide a list of the plurality of accounts that are eligible to be actively associated with the token (e.g. the FVC) provisioned on the user device. The user 102 may associate multiple cards (e.g. multiple accounts) with the FVC using a mobile application (e.g. digital wallet) or an online platform (e.g. website). For example, the user may select three cards 105 for active association with the FVC token through a graphical user interface (GUI) or a website displayed on the user device 104. Each of the three cards 105 may be associated with an account issued by a different authorizing entity. Accordingly, the token associated with the FVC may represent (or be associated with) a plurality of user accounts issued by different issuers. The user may further define a set of rules for processing transactions using the FVC. For example, the user may indicate that the transactions conducted with the FVC is to be divided equally among the three cards 105. Alternatively, the user may assign predetermined percentages to each one of the three cards.

The transaction processing network computer 110 may receive the three cards 105 as a first selection of accounts from the user along with the set of rules. The transaction processing network computer 110 may store an active association between the token (or the FVC) and the first selection of accounts (e.g. the three accounts 105), as well as the set of rules at a database (e.g. the same token vault storing the mapping between the token and the FVC identifier, or a separate database).

At step 3, the transaction processing network computer 110 may inform the authorizing entities 112, 114, 116 associated with each one of the multiple cards that the user associated an account generated by respective authorizing entities with the FVC. That is, the transaction processing network computer 110 may inform the authorizing entities 112, 114, 116 of the active association between the FVC (or the token associated with the FVC) and the account generated by respective authorizing entities 112, 114, 116.

At step 4, the user 102 may conduct a transaction using the FVC provisioned on the user device 104. The transaction may be a payment transaction (e.g., for the purchase of a good or service), an access transaction (e.g., for access to a transit system), or any other suitable transaction. For example, the user may tap the user device 104 against an NFC reader of the access device 106, or otherwise bring the user device 104 into a near field communication range with the access device 106, to perform a contactless transaction. Alternatively, the user may swipe or dip the user device 104 in the access device 106 to perform a contact transaction. In some embodiments, the transaction may be an electronic (e.g. online) transaction, and the user may provide the FVC token provisioned on the user device 104 to a mobile app or a website of the resource provider. During the communication between the access device 106 and the user device 104, the user device 104 may transmit account identifier (e.g. the token) associated with the FVC.

At step 5, the access device 106 (or a computer in operative communication with the access device 106) may generate an authorization request message for the transaction. The authorization request message may include information associated with the transaction (e.g. transaction category, items purchased, transaction amount), the account identifier (e.g. the token) associated with the FVC as well as information associated with the resource provider (e.g. merchant identifier, merchant category). The access device 106 may transmit the authorization request message to the transport computer 108.

At step 6, the transport computer 108 may analyze the authorization request message, identity the token, and identify a transaction processing network associated with the token and/or the FVC. The transport computer 108 may then transmit the authorization request message to the identified transaction processing network computer 110.

Upon receiving the authorization request message, the transaction processing network computer 110 may identify the token, and de-tokenize the token. That is, the transaction processing network computer 110 may provide the token to a database (e.g. token vault) that stores a mapping between the token and the FVC. The transaction processing network computer 110 may retrieve an identifier for the FVC from the token vault. The transaction processing network computer 110 may then identify that the identifier is for a FVC, which is associated with a plurality of accounts (e.g. cards) of the user. The transaction processing network computer 110 may then retrieve from the same or a different database the account identifiers for the plurality of accounts associated with the FVC for the specific transaction (e.g. the accounts that are actively associated with the FVC for the specific transaction). The transaction processing network computer 110 may also retrieve from the database the first ruleset associated with the FVC. In some embodiments, the first ruleset may indicate which one(s) of the accounts associated with the FVC are to be used to process the current transaction, as well as additional processing rules (e.g. a percentage assignment of the transaction amount among the plurality of accounts). For example, the first ruleset may include instructions to split the total transaction amount among the two or more of the plurality of accounts identified in the first selection according to a predetermined scheme (e.g. equally, according to assigned percentages, etc.). If applicable, the transaction processing network computer 110 may determine the partial transaction amount for each one of the selected accounts for processing the transaction. The transaction processing network computer 110 may then generate an issuer-specific authorization request message for each one of the selected accounts such that the issuer-specific authorization request message includes at least the partial transaction amount and an account identifier for the selected account.

At step 7, the transaction processing network computer 110 may transmit each issuer-specific authorization request message to corresponding authorizing entity computers 112, 114, 116. Each authorizing entity computer 112, 114, 116 may process their respective issuer-specific authorization request message and determine whether the transaction (e.g. for the partial transaction amount) is authorized or declined. The authorizing entity computers 112, 114, 116 may reach return an issuer-specific authorization response message including at least an indication of whether the transaction (e.g. for the partial transaction amount) is authorized or declined. Upon compiling the issuer-specific authorization responses from the authorizing entity computers 112, 114, 116, the transaction processing network computer 110 may generate an authorization response message, and transmit the authorization response message to the transport computer 108, which then relays the authorization response message to the access device 106 and/or a resource provider computer associated with the access device 106.

According to various embodiments, the transaction could be authorized if the transaction processing network computer 110 receives an authorization confirmation for each one of the issuer-specific authorization request messages. In some embodiments, if an authorizing entity computer 112, 114, 116 returns a declined message for its issuer-specific authorization request message, the user 102 may be given a chance to change the selection of cards by removing or replacing the account (e.g. card) associated with the rejected request. In such a decline scenario, the transaction may be re-processed using the updated selection (e.g. the updated active association of accounts with the FVC that excludes the account (e.g. card) associated with the rejected request) from the user.

Once the transaction is processed, the clearing and settlement process may occur. At step 8, the transport computer 108 may send a clearing and settlement request message for the transaction using the token or the identifier for the FVC. The transaction processing network computer 110 may once again retrieve the accounts actively associated with the FVC for the particular transaction, and generate an issuer-specific clearing and settlement request message for the authorizing entities associated with the accounts actively associated with the FVC.

At step 9, the transaction processing network computer 110 may transmit the issuer-specific clearing and settlement request messages to respective authorizing entity computers 112, 114, 116. Each authorizing entity computer 112, 114, 116 may process their respective issuer-specific clearing and settlement request message and complete the settlement process with the transaction processing network computer 110. Upon finalizing the settlement with each one of the authorizing entity computers 112, 114, 116, the transaction processing network computer 110 may inform the transport computer 108 that the clearing and settlement processing for the transaction has been finalized.

At step 10, the fund transfer between the transport computer 108 and the authorizing entity computers 112, 114, 116 occur pursuant to the clearing and settlement processing for the transaction, whereby actual funds are transferred from an account associated with the user (e.g., maintained by the authorizing entity computers 112, 114, 116) to an account associated with the resource provider (e.g., maintained by the transport computer 108).

Figure 2:
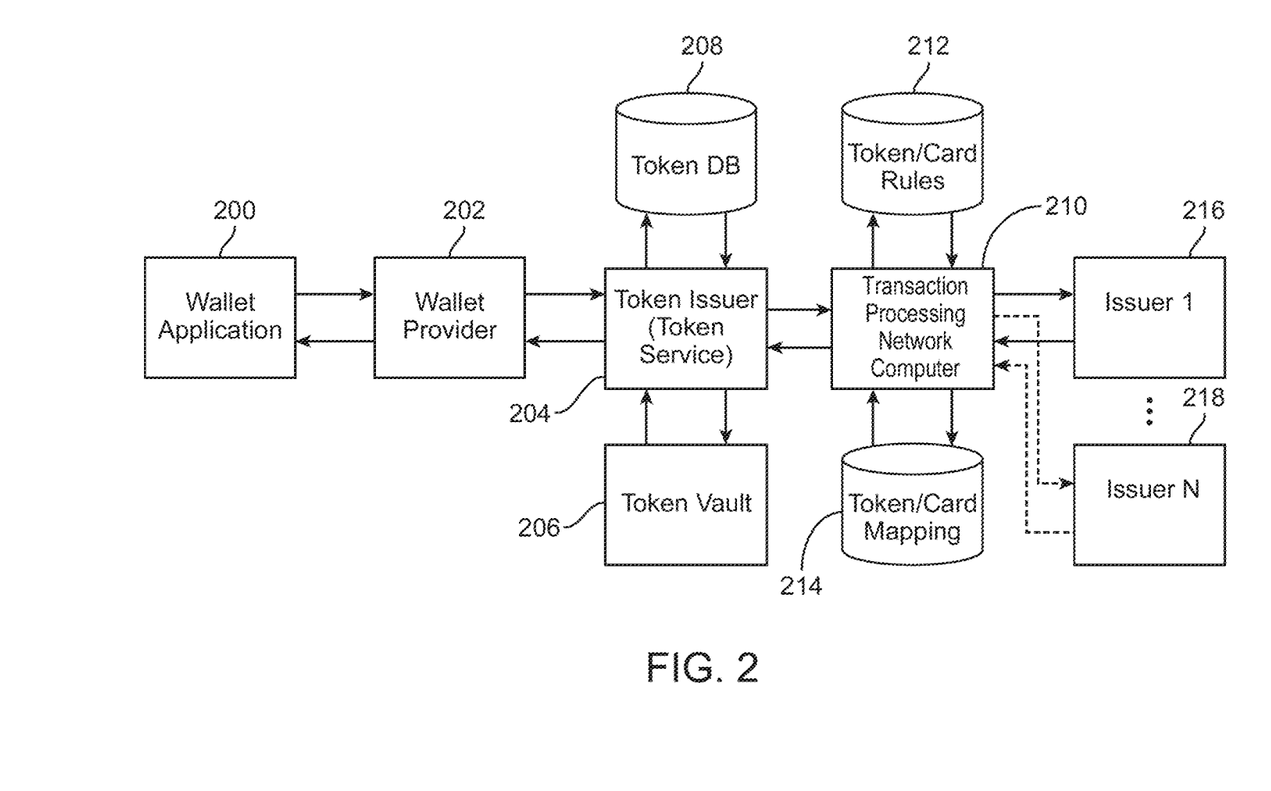
FIG. 2 shows a block diagram for a system for provisioning a FVC on an electronic wallet according to various embodiments.

FIG. 2 shows a block diagram for a system for provisioning a FVC on an electronic wallet according to various embodiments. In some embodiments, the below description of FIG. 2 may correspond roughly to steps 1-3 illustrated in FIG. 1.

According to various embodiments, the transaction processing network computer 210 may receive a request from a user for provisioning a FVC on a user device of the user. In some embodiments, the transaction processing network computer 210 may provide the option of provisioning the FVC on the user device. As provided above, the FVC may be associated with a plurality of accounts (e.g. cards) of the user issued by one or more authorizing entities, and configured for processing by one or more transaction processing entities. Thus, embodiments provide the ability to associate one token provisioned on a user device with multiple accounts (e.g. payment cards) of the user.

The transaction processing network computer 210 may generate a FVC account associated with a FVC identifier. Based on a user request (or a default setting), the FVC account may be provisioned on a user device. According to various embodiments, a token may need to be generated for the FVC account for provisioning the FVC account on an electronic wallet on the user device. The token may act as a proxy for the FVC identifier. According to various embodiments, the wallet application 200 (or other token-based payment application) installed on a user device may make a call to the wallet provider 202 service associated with the wallet application 200 to request for a token to be created and registered to the FVC by making a Token Create API request to the token issuer 204. The wallet application 200 may send device identifying information and credentials (e.g. device identifier and secret key) along with account information (e.g. account holder name, account number, CVV2, expiration date) to the wallet provider 202, which in turn calls the token issuer 204 to request a new token. The token issuer 204 may request a new token from the token vault 206, which generates a new token (e.g. FVC token), stores the new token at the token database 208 and returns the token to the token issuer 204.

The token issuer 204 then sends the account information and the newly created token details to the transaction processing network computer 210 to complete the association. The transaction processing network computer 210 may validate the credentials and store a mapping between the FVC account identifier and the FVC token at a first database 214.

In some embodiments, the initial token generation request may include an identifier for a first user account issued, for example, by the first issuer 216. Thus, when the token is generated, the token could be associated with the first account and the FVC. The user may then add additional accounts to be associated with the FVC and the FVC token via, for example, the wallet application 200. For example, the transaction processing network computer 210 may provide, to the user, a list of available accounts that may be associated with the FVC. The user may make a selection of one or more accounts (in addition to the first account issued by the first issuer 216), and return the selection to the transaction processing network computer 210. The transaction processing network computer 210 may store an association between the user accounts and the FVC at the first database 214, or at a second database 212. That is, in some embodiments, the first database 214 and the second database 212 may be combined into a single database. The transaction processing network computer 210 may then notify the issuers 216, 218 for each of the accounts about the association between the account generated by the respective issuers and the FVC token.

In other embodiments, the user may provide, to transaction processing network computer 210, the selection of two or more accounts to be associated with the FVC token after the FVC token has been generated and provisioned on the wallet application 200. For example, after the FVC token has been provisioned on the wallet application 200, the transaction processing network computer 210 may provide, to the user, a list of available accounts that may be associated with the FVC. The user may make a selection of two or more accounts, and return the selection to the transaction processing network computer 210. The transaction processing network computer 210 may store an association between the user accounts and the FVC at the first database 214, or at a second database 212. The transaction processing network computer 210 may then notify the issuers 216, 218 for each of the accounts about the association between the account generated by the respective issuers and the FVC token. The issuers 216, 218 may store the association between the FVC token and the account issued by respective issuer 216, 218, and respond to the transaction processing network computer 210 confirming the association is successful.

According to various embodiments, the transaction processing network computer 210 may store the association between the plurality of accounts available to be associated with the FVC account and/or the FVC token as a "passive association". The passive association may indicate a list of accounts that may potentially be associated with the FVC token for a given transaction. When the user selects a subset (or all) of the accounts having the passive association status to be actively associated with the FVC or the FVC token, the transaction processing network computer 210 stores the association between the plurality of accounts selected by the user to be associated with the FVC account and/or the FVC token as an "active association". For example, the transaction processing network computer 210 may store 5 user accounts as passively associated with the FVC token. For a given transaction or a transaction type (as indicated, for example, by transaction amount, resource provider location, resource provider type, or services/items purchased), the user may select 3 accounts out of 5 for active association for processing the given transaction. Thus, even though the 5 accounts are available for selection, the user may choose a subset for active association. The 2 non-selected accounts may remain as passively associated with the FVC token, and the user may select those accounts for a different transaction. In some embodiments, the user may select all available accounts (e.g. 5 accounts in the above example) for active association for processing the given transaction. A card can be added to or removed from a federation without disrupting the card holder's ability to use the card to transact outside the federation.

The user, via the wallet application 200, may choose to associate additional physical or pseudo cards with the FVC token by calling a token association API provided by the token issuer 204 via the wallet provider 202. The wallet application 200 makes a call to the wallet provider 202 with an existing FVC token to be associated with an addition physical or pseudo card using a previously generated token number by calling the token association API with the appropriate identification and credentials along with the token number and card details such as card number, name on card, expiry date, CVV2 to be associated. The wallet provider 202 relays the token and card details along with its credentials to the token issuer 204 using its token association API. The token issuer 204 verifies the credentials of the wallet provider 202 and makes sure that the token exists and is a valid token by referencing the token database 208. If it is a valid token, the request is made to transaction processing network computer 210 to associate the token with the additional card. The transaction processing network computer 210 then follows the same process to inform the correct account issuer (e.g. issuer N 218) to associate the provided card with the token. If successful, the issuer 218 returns a success message and the transaction processing network computer 210 creates an additional association from the token to the additional card in the token/card mapping database 214 and returns a success message to the token issuer 204 which in turn returns a success message to the wallet provider 202 and subsequently the wallet application 200. According to various embodiments, no changes are made to the processing rules for the newly associated card. The rule definition may be done using an explicit rule definition API, as explained next.

As provided above, the user may also provide set of rules for the FVC token using, for example, the GUI associated with the wallet application 200. For example, the set of rules may indicate which accounts are selected for active association for a particular transaction, and how the accounts are to be used in processing the transaction (e.g. how to split the transaction amount among the accounts selected for active association). The transaction processing network computer 210 may store the set of rules in a rules database (e.g. the second database) 212 as associated with the FVC account/FVC token. The rules may remain in effect until changed by the card holder or the expiry of cards. According to various embodiments, the rules may be based on fixed percentages, transaction categories, merchant category, merchant identifier, and other attributes (e.g. fields) available in an authorization request message. In some embodiments, before receiving a specific ruleset from the user, the transaction processing network computer 210 may create a default rule in a rules database (e.g. the second database 212) to use the FVC for all transactions.

In some embodiments, the user may provide a first set of rules to be used in a first transaction. The transaction processing network computer 210 may store the first set of rules at the rules database (e.g. second database) 212 and process the first transaction based on the first set of rules. As provided above, the first set of rules may include a selection of first set of accounts for active association with the FVC token). In addition, the user may provide a second set of rules to be used in a second transaction. The transaction processing network computer 210 may store the second set of rules at the rules database (e.g. second database) 212 and process the second transaction based on the second set of rules. As provided above, the second set of rules may include a selection of second set of accounts for active association with the FVC token). The second set of accounts may include one or more accounts that are also included in the first set of accounts. Alternatively, the second set of accounts and the first set of accounts may be mutually exhaustive. The transaction processing network computer 210 may store the first set of rules as a first entry in the rules database 212 and the second set of rules as a second entry in the rules database 212. In some embodiments, the second entry may replace the first entry at the rules database 212.

According to various embodiments, the rules may be defined using a rule definition API provided by the token issuer 204. Rules can define which physical or pseudo card to charge or to reject payments on the conditions defined. For instance, a rule might be added to process all amounts more than $100 on a card that has a lower interest rate or a longer billing cycle. A user may also choose to add a rule to reject transactions that are above a certain amount or set a spend limit on each card or all cards associated with the token. An exemplary cardholder-initiated rule update is provided below for illustrative purposes. In the exemplary rule update request, the cardholder specified two trigger types: Amount and Merchant Category Code. When the transaction amount is up to $1000, the charge should be split equally between the two card accounts specified; and when the merchant category matches MCC 4111, 4112 or 4131, the transaction should be charged to the card specified. When no rule match, the primary account number is charged. The TriggerPriority field defines the execution order for each rule and ensures that rules are not executed in arbitrary order based on rule uploads sequence. In addition, it ensures that rules can be updated individually without changing other rules.

```
{
  "CardholderTriggerUpdate": {
    "sourceStationID": "1010320",
    "primaryAccountNumber": "4250311029524940",
    "cardholderServiceKey": "8561786725500682",
    "dateAndTimeTransmission": "2021-03-31T00:00:40Z",
    "systemsTraceAuditNumber": "100000",
    "fileSecurityCode": "jpg",
    "tokenReferenceID": "FVC12301620086308986349",
    "cardholderTriggerOptions": {
      "triggerService": "FVC",
      "triggerItems": {
        "triggerItem": [
          {
            "triggerType": "Amt",
            "triggerPriority": "1",
            "triggerOverrides": {
              "triggerOverride": [
                {
                  "amountThreshold": {
                    "amountCurrencyCode": "840",
                    "amountMinorUnits": "2",
                    "amountValue": "1000",
                    "tokenAccountNumbers":
                      ["4005105010000002","4001400240034004"]
                  }
                }
              ]
            }
          },
          {
            "triggerType": "MCC",
            "triggerPriority": "2",
            "triggerOverrides": {
              "triggerOverride": [
                {
                  "merchantCategory" :
                    ["4111","4112","4131"],
                  "tokenAccountNumbers":
                    ["4000220000000007"]
                }
              ]
            }
          }
        ]
      }
    },
    "transportData": "10101010185617867255000682"
  }
}
```

According provided above, the wallet application 200 may have a GUI to enable the user to define the rules, which will be translated to machine readable format (e.g. XML, JSON, or some other programming or rule definition language) suitable to describe arbitrarily complex rules that are then used to create the request to the wallet provider 202 by calling the rule definition API along with credentials and token number. The wallet provider 202 may validate the credentials as well as the structure of the rule, and send the request to the token issuer 204, which may validate the token number using the token database 208 along with the credentials provided. The token issuer 204 then relays the request to the transaction processing network computer 210.

The transaction processing network computer 210 verifies the structure of the rule and performs a syntax and semantic analysis on the validity of the rule defined along with security checks and replaces the current rules registered for the token with the one received for the wallet application 200. The transaction processing network computer 210 stores the rule in the rules database 212 and returns a success code to the wallet application 200 via the token issuer 204 and the wallet provider 202 respectively.

According to various embodiments, the user may wish to remove (e.g. disassociate) an account from being associated with the FVC. The user may, via the wallet application 200, select the physical or pseudo card (e.g. account) to be disassociated from the FVC token by calling a token disassociation API provided by the token issuer 204 via the wallet provider 202. The wallet application 200 makes a call to the wallet provider 202 with an existing token to be disassociated with a physical or pseudo card using a previously generated token number by calling the token disassociation API with the appropriate identification and credentials along with the token number and card details such as card number. The wallet provider 202 relays the token and card details along with its credentials to the token issuer 204 using its token disassociation API. The token issuer 204 verifies the credentials of the wallet provider 202 and makes sure that the token exists; that the token is a valid token; and that the token is associated with the FVC provided by consulting (e.g. looking up in) the token database 208. If it is a valid token the request is made to the transaction processing network computer 210 to disassociate the token with the card. The transaction processing network computer 210 then informs the correct issuer (e.g. issuer N 218) to disassociate the provided card with the token. If successful, the issuer 218 returns a success message and the transaction processing network computer 210 removes any rules associated with the disassociated card along with the recorded association of the token to the card in the token/card mapping database 214 and returns a success message to the token issuer 204, which in turn returns a success message to the wallet provider 202, and subsequently the wallet application 200. If the disassociated card is the only card associated with the token, the transaction processing network computer 210 may set up a reject rule in the token/card mapping database 214 to prevent processing of any new payment authorizations using the FVC.

In some embodiments, the token issuer 204 and the transaction processing network computer 210 may be part of (e.g. managed by) a same transaction processing network. According to some embodiments, the transaction processing network computer 210 may perform the functions of the token issuer 204 and the token vault 206. While FIG. 2 illustrates three separate databases 208, 212, 214, according to various embodiments two or all three databases may be combined together into a single database.

Figure 3:
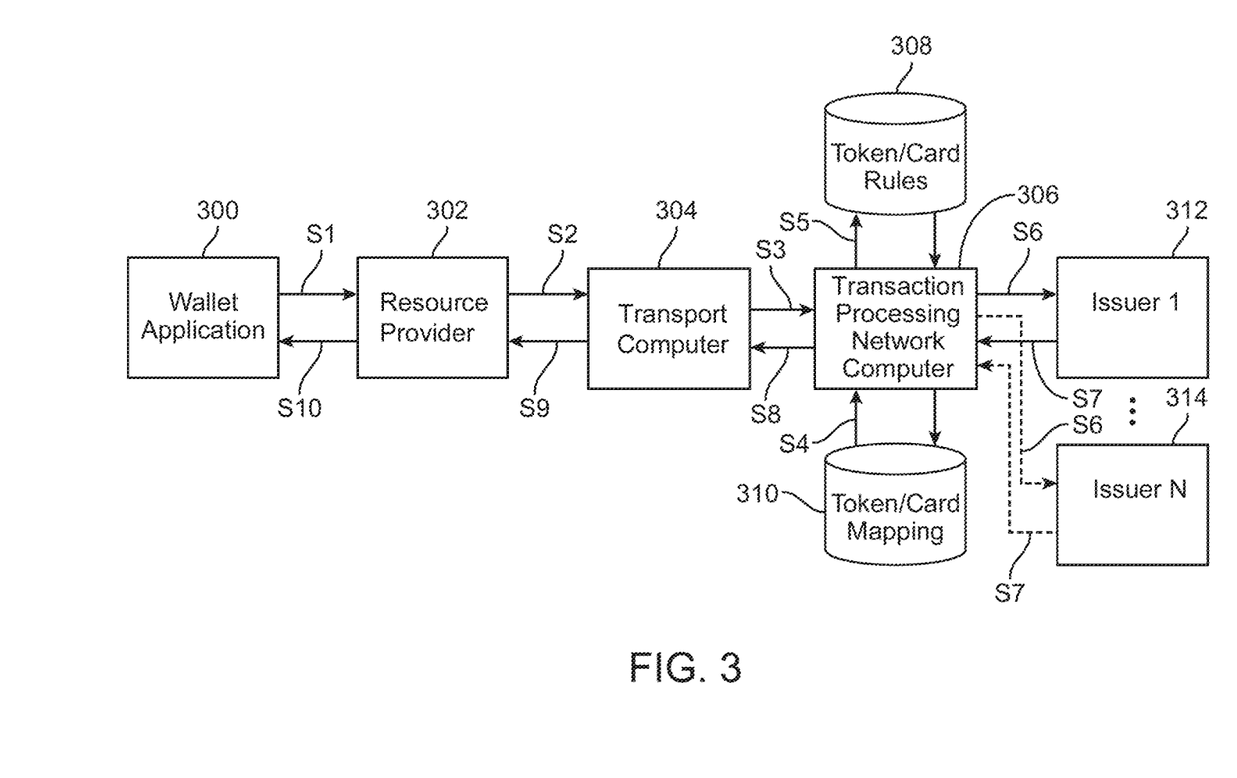
FIG. 3 shows a block diagram for a system for processing a transaction using a FVC token according to various embodiments.

FIG. 3 shows a block diagram for a system for processing a transaction using a FVC token according to various embodiments. In some embodiments, the below description of FIG. 2 may correspond roughly to steps 4-10 illustrated in FIG. 1.

Upon having the FVC token provisioned on the user device, the user may wish to conduct a transaction at a resource provider (e.g. merchant) 302. For example, the user may wish to purchase goods or services provided by the resource provider 302. The transaction may be an in-store transaction or an electronic (e.g. online) transaction.

At step S1, the user may transmit the FVC to the resource provider 302. For example, the user may physically present the user device to the access device of the resource provider 302, or the electronic wallet application 300 may transmit the FVC token to a merchant application or a merchant website on the user device.

At step S2, the resource provider 302 may generate an authorization request message including at least the FVC token and transaction data (e.g. a transaction amount). The authorization request message may further include information associated with the resource provider. The resource provider 302 may transmit the authorization request message to the transport computer 304. At step S2, the transport computer 304 transmits the authorization request message to the transaction processing network computer 306.

The transaction processing network computer 306 may identify the FVC token in the authorization request message. At step S4, the transaction processing network computer 306 retrieves the account identifiers that are in passive association with the FVC token from the database 310. At step S5, the transaction processing network computer 306 retrieves the set of rules associated with the FVC from the database 308. As provided above, the databases 310 and 308 may be merged into a single database, and steps S4 and S5 may be performed simultaneously. Once the transaction processing network computer 306 has the list of accounts that are in passive association with the FVC token, and the set of rules that will be applied to the current transaction, the transaction processing network computer 306 may perform a series of checks. For example, the transaction processing network computer 306 may ensure that the accounts selected for active association are listed among the list of accounts that are in passive association. The transaction processing network computer 306 may also ensure that transaction details comply with the set of rules retrieved from the database 308.

The transaction processing network computer 306 may then determine transaction amount to be applied to each one of the selected accounts for active association, and generate issuer-specific authorization request messages for each issuer of each one of the selected accounts for active association. For example, the transaction processing network computer 306 may generate a first issuer-specific authorization request message including a first portion of the transaction amount. The transaction processing network computer 306 may generate a second issuer-specific authorization request message including a second portion of the transaction amount. A sum of the first portion and the second portion of the transaction amount may be equal to a total transaction amount.

According to various embodiments, the transaction processing network computer 306 may store two or more sets of rules at the rules database 308. The transaction processing network computer 306 may determine which set of rules to use for a given transaction. For example, the transaction processing network computer 306 may identify information associated with the transaction in the authorization request message received from the transport computer 304. According to an illustrative example, the user may have defined a first set of rules set for using a first set of accounts for transactions conducted at healthcare providers, and a second set of rules for using a second set of accounts for transactions conducted at restaurants. If the transaction processing network computer 306 determines that the transaction subject to the authorization request message received from the transport computer 304 is conducted at a healthcare provider, transaction processing network computer 306 will process the transaction using the first set of accounts. On the other hand, if transaction processing network computer 306 determines that the transaction subject to the authorization request message received from the transport computer 304 is conducted at a restaurant, the transaction processing network computer will process the transaction using the second set of accounts.

In some embodiments, the processing network computer may store a single set of rules at the rules database 308. In such embodiments, the transactions will be processed using the default rules saved on the rules database 308. If the user would like to change the set of rules, the user may provide a new set of rules that will replace the existing set of rules stored at the rules database 308 thereafter, any future transactions will be processed using the new set of rules. In such embodiments, the new set of rules replace the existing set of rules on the rules database 308.

At step S6, the transaction processing network computer 306 may then send the issuer-specific authorization request messages to issuers of the selected accounts for active association. For example, and transmit the first issuer-specific authorization request message to the first issuer 312 of the first account indicated as a selected account for active association. The transaction processing network computer 306 may generate a second issuer-specific authorization request message including a second portion of the transaction amount, and transmit the second issuer-specific authorization request message to the second issuer 314 of the second account indicated as a selected account for active association. A sum of the first portion and the second portion of the transaction amount may be equal to a total transaction amount.

At step S7, the transaction processing network computer 306 may receive an issuer-specific authorization response message from each one of the issuers 312, 314 for the partial amounts that were included in the issuer-specific authorization request messages sent in step S6. The transaction processing network computer 306 then aggregates the issuer specific authorization response messages into a single authorization response message and transmits the authorization response message to the transport computer 304 at step S8. According to some embodiments, the transaction may be authorized if all of the issuers 312, 314 authorizes the partial amount of the transaction that are assigned to individual issuers. That is, the transaction may be authorized if all partial amounts of the transaction are authorized. In case there is at least one declined partial amount, the user may be notified of the declined amount. The user may modify the set of rules including the accounts associated with the FVC via the wallet application 300, and re-process the transaction using the new ruleset and/or the new set of accounts actively associated with the FVC. In other embodiments, when there is a declined partial amount, the user may be allowed to modify the set of rules and or the account actively associated with the FVC via the wallet application 300 prior to returning a declined transaction message to the resource provider.

At step S9, the transport computer 304 may send the authorization response message to the resource provider 302. At step S10, the resource provider 302 may inform the user of the outcome of the transaction. For example, the resource provider 302 may display the result of the transaction on the access device associated with the resource provider 302, or on an application displayed on the user device (e.g. the wallet application 300, a resource provider application, a web browser).

Figure 4:
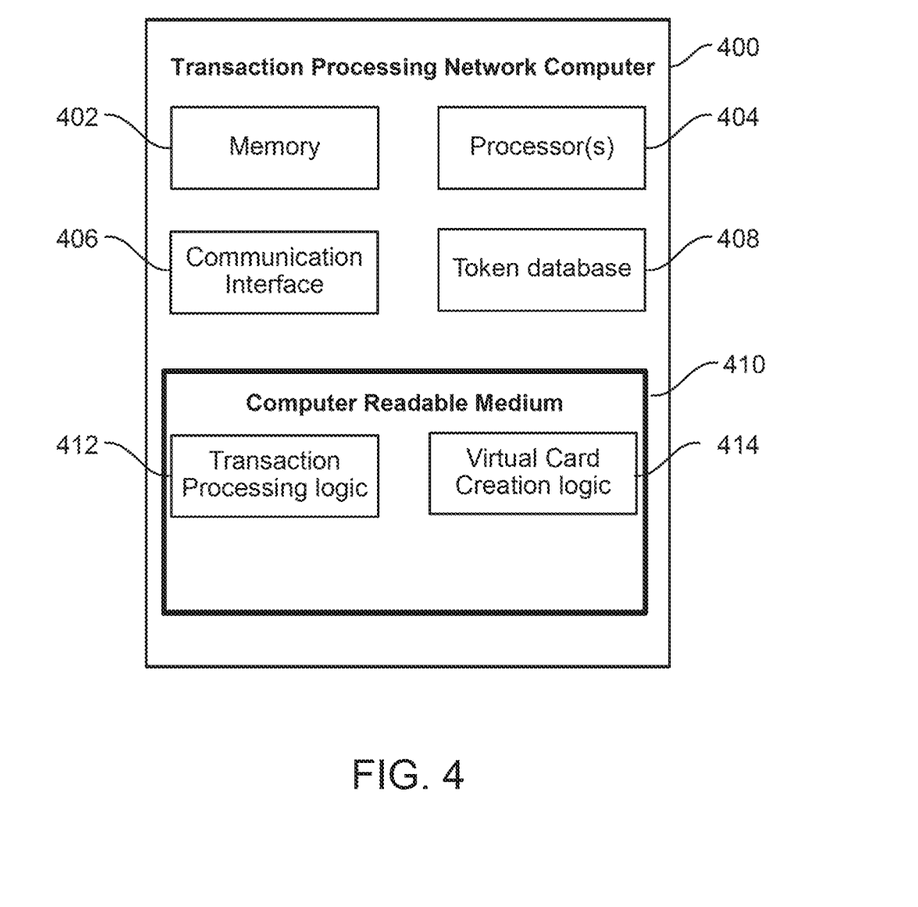
FIG. 4 illustrates a block diagram of a transaction processing network computer according to various embodiments.

FIG. 4 illustrates a block diagram of a transaction processing network computer according to various embodiments. The transaction processing network computer 400 includes one or more processors 404 that may be coupled to a memory 402, a communication interface 406, one or more databases 408 and a computer readable medium 410. The computer readable medium 410 can comprise transaction processing logic 412, a virtual card (e.g. FVC) creation logic 414, and other suitable modules.

The memory 402 can be used to store data and code. The memory 402 may be coupled to the one or more processor(s) 404 internally or externally (e.g., cloud based data storage), and may comprise any combination of volatile and/or non-volatile memory, such as RAM, DRAM, ROM, flash, or any other suitable memory device.

The communication interface 406 may be configured to enable communication between the transaction processing network computer 400 and another electronic devices (e.g., transport computer, authorizing entity computer, wallet provider, etc.).

According to various embodiments, the computer readable medium 410 may comprise code, executable by the one or more processor(s) 404, for performing a method comprising acquiring credentials associated with a plurality of accounts of a user; generating a virtual card having a virtual card identifier; determining a token associated with the virtual card, wherein the token acts as a proxy for the virtual card identifier; provisioning the virtual card on a user device of the user; storing a passive association between the token and the plurality of accounts of the user at a database; providing a list of the plurality of accounts of the user that are eligible to be associated with the virtual card; receiving a first selection of two or more of the plurality of accounts and a first ruleset from the user; storing an active association of the two or more of the plurality of accounts identified in the first selection and the virtual card along with the first ruleset as a first entry on the database; receiving an authorization request message associated with a first transaction including credentials associated with the virtual card; and processing the first transaction using the two or more of the plurality of accounts identified in the first selection and the first ruleset. In some embodiments, the method may include upon receiving the authorization request message, retrieving the first entry from the database; and identifying the two or more of the plurality of accounts and the first ruleset based on the first entry.

The computer readable medium 410 may include the virtual card creation logic 414 for generating the FVC card. For example, the virtual card creation logic 414 may acquire the credentials associated with a plurality of accounts of a user, including at least a first account and a second account. The first account and the second account may be issued by two different issuers. The virtual card creation logic 414 may generate the FVC associated with a FVC identifier. In some embodiments, the virtual card creation logic 414 in combination with additional logic or modules of the transaction processing network computer 400 may determine a FVC token associated with the FVC. The FVC token acts as a proxy for the FVC identifier. The transaction processing network computer 400 may generate the FVC token or the transaction processing network computer 400 may receive the FVC token from a token generator (e.g. token issuer). According to various embodiments, the transaction processing network computer 400 and the token issuer may be part of a same transaction processing network. The virtual card creation logic 414 in combination with additional logic or modules of the transaction processing network computer 400 may provision the FVC on a user device of the user, and store a passive association between the token and the plurality of accounts of the user at one of the databases 408. The virtual card creation logic 414 in combination with additional logic or modules of the transaction processing network computer 400 may provide a list of the plurality of accounts of the user that are eligible to be associated with the FVC and receive a first selection of two or more of the plurality of accounts and a first ruleset from the user. The active association of the two or more of the plurality of accounts identified in the first selection and the virtual card along with the first ruleset may be stored as a first entry on the database 408.

The computer readable medium 410 may include the transaction processing logic 412 for processing transactions using the FVC card. For example, the transaction processing logic 412 may receive an authorization request message associated with a first transaction including credentials associated with the virtual card, retrieve the first entry from the database; identify the two or more of the plurality of accounts and the first ruleset based on the first entry, and process the first transaction using the two or more of the plurality of accounts identified in the first selection and the first ruleset. In some embodiments, the virtual card creation logic 414, in combination with additional logic or modules of the transaction processing network computer 400, may receive a second selection of two or more of the plurality of accounts and a second ruleset from the user, and store an active association of the two or more of the plurality of accounts identified in the second selection and the virtual card along with the second ruleset as a second entry on the database 408. The virtual card creation logic 414 may then receive an authorization request message associated with the second transaction including the virtual card; and process the second transaction using the two or more of the plurality of accounts identified in the second selection and the second ruleset.

In some embodiments, the transaction processing network computer 400 may store two or more rule sets at the database and may need to determine which rule set to apply to a given transaction. For example, the transaction processing logic 412 may identify properties of the first transaction and the second transaction. The transaction processing logic 412 may determine that the first transaction is to be processed using the two or more of the plurality of accounts identified in the first selection and the first rule set based on the properties of the first transaction. Similarly, the transaction processing logic 412 may determine that the second transaction is to be processed using the two or more of the plurality of accounts identified in the second selection and the second rule set based on the properties of the second transaction.

According to various embodiments, processing the first transaction using the two or more of the plurality of accounts identified in the first selection and the first ruleset further comprises: generating an issuer-specific authorization request message for each one of the two or more of the plurality of accounts identified in the first selection; transmitting issuer-specific authorization request messages to issuers of each one of the two or more of the plurality of accounts identified in the first selection; receiving a decline authorization response message from an issuer of an account; receiving a second selection of one or more of the plurality of accounts and a second ruleset from the user, wherein the second selection removes the account associated with the issuer transmitting the decline authorization response message; and continue processing, by the server computer, the first transaction using the one or more of the plurality of accounts identified in the second selection and the second ruleset.

Embodiments provide various advantages. According to various embodiments, a token may be associated with multiple accounts or multiple cards (e.g. multiple user cards). Therefore, embodiments allow for presenting a single token for conducting a transaction, while being able to split the transaction amount among multiple accounts of the user that are linked to the single token without providing sensitive information (e.g. account identifier, CVV, expiry date, etc.) associated with each account. Embodiments further allow the users to define rules by which transactions are processed (e.g. based on transaction type, merchant type, merchant identifier, location, and other information available in the authorization request). Embodiments provide a user interface that allows adding or removing accounts that are associated with the token.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

The above description is illustrative and is not restrictive. Many variations will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
acquiring, by a server computer, credentials associated with a plurality of accounts of a user;
generating, by the server computer, a virtual card having a virtual card identifier;
generating, by the server computer, a token associated with the virtual card, wherein the token is a proxy for the virtual card identifier;
provisioning, by the server computer, the virtual card on a digital wallet application stored on a mobile communication device of the user by transmitting the token to the digital wallet application on the mobile communication device;
storing, by the server computer, a passive association between the token and the plurality of accounts of the user at a database;
providing, by the server computer, a list of the plurality of accounts of the user that are eligible to be associated with the virtual card;
receiving, by the server computer from the digital wallet application on the mobile communication device, a first selection of two or more of the plurality of accounts and a first ruleset from the user via a first API call, wherein the API is provided by the server computer and creates a communication channel between the server computer, the digital wallet application and a digital wallet provider that manages the digital wallet application;
storing, by the server computer, an active association of the two or more of the plurality of accounts identified in the first selection and the virtual card along with the first ruleset as a first entry on the database, wherein the token is a proxy for the two or more of the plurality of accounts based on the active association;
receiving, by the server computer, an authorization request message associated with a first transaction including the token instead of identifiers for the two or more of the plurality of accounts;
identifying, by the server computer, the token in the authorization request message;
retrieving, by the server computer from the database, the two or more of the plurality of accounts associated with the token;
processing, by the server computer, the first transaction using the two or more of the plurality of accounts identified in the first selection and the first ruleset, wherein the processing comprises:
  identifying two or more issuers associated with the two or more of the plurality of accounts based on an issuer identifier incorporated in each one of the identifiers for the two or more of the plurality of accounts;
  generating an issuer-specific authorization request message for each one of the two or more issuers;
  transmitting, by the server computer, the issuer-specific authorization request message to each one of the two or more issuers associated with the two or more of the plurality of accounts;
  receiving, by the server computer, an authorization response message from each of the two or more issuers in response to each issuer-specific authorization request message;
  aggregating, by the server computer, authorization response messages from the two or more issuers into an aggregated authorization response message;
  transmitting, by the server computer, the aggregated authorization response message to a resource provider;
receiving, by the server computer, a second API call from the digital wallet application on the mobile communication device requesting to add an additional account to be associated with the token in addition to the two or more of the plurality of accounts identified in the first selection, wherein the second API call includes at least (1) the token, and (2) an account identifier for the additional account, wherein the additional account was not included among the plurality of accounts of the user;
analyzing, by the server computer, the database to confirm that the token is a valid token; and
creating, by the server computer on the database, an additional active association from the token to the additional account,
wherein the additional active association indicates that the token is the proxy for (1) the two or more of the plurality of accounts identified in the first selection, and (2) the additional account.

2. The method of claim 1, further comprising:
upon receiving the authorization request message, retrieving the first entry from the database; and
identifying the two or more of the plurality of accounts and the first ruleset based on the first entry.

3. The method of claim 1, further comprising:
receiving, by the server computer, a second selection of two or more of the plurality of accounts and a second ruleset from the user;
storing, by the server computer, an active association of the two or more of the plurality of accounts identified in the second selection and the virtual card along with the second ruleset as a second entry on the database;
receiving, by the server computer, an authorization request message associated with a second transaction including the virtual card; and
processing, by the server computer, the second transaction using the two or more of the plurality of accounts identified in the second selection and the second ruleset, entry.

4. The method of claim 3, wherein the second entry replaces the first entry.

5. The method of claim 3, wherein both the first entry and the second entry are stored in the database.

6. The method of claim 3, further comprising:
identifying properties of the first transaction and the second transaction;
determining that the first transaction is to be processed using the two or more of the plurality of accounts identified in the first selection and the first ruleset based on the properties of the first transaction; and
determining that the second transaction is to be processed using the two or more of the plurality of accounts identified in the second selection and the second ruleset based on the properties of the second transaction.

7. The method of claim 1, further comprising:
transmitting, by the server computer, a message to an issuer of each one of the plurality of accounts informing each issuer of the passive association between the token and an account issued by the issuer.

8. The method of claim 1, wherein at least two of the plurality of accounts are issued by two different issuers.

9. The method of claim 1, wherein the first ruleset includes instructions to split an amount of the first transaction among the two or more of the plurality of accounts identified in the first selection according to a predetermined scheme.

10. The method of claim 1, wherein processing the first transaction using the two or more of the plurality of accounts identified in the first selection and the first ruleset further comprises:
receiving, by the server computer, a decline authorization response message from an issuer of an account;
receiving, by the server computer, a second selection of one or more of the plurality of accounts and a second ruleset from the user, wherein the second selection removes the account associated with the issuer transmitting the decline authorization response message; and
continue processing, by the server computer, the first transaction using the one or more of the plurality of accounts identified in the second selection and the second ruleset.

11. A system comprising:
one or more processors;
a memory storing instructions that, when executed by the one or more processors, cause the one or more processors to:
  acquire credentials associated with a plurality of accounts of a user;
  generate a virtual card having a virtual card identifier;

generate a token associated with the virtual card, wherein the token is a proxy for the virtual card identifier;
provision the virtual card on a digital wallet application stored on a mobile communication device of the user by transmitting the token to the digital wallet application on the mobile communication device;
store a passive association between the token and the plurality of accounts of the user at a database;
provide a list of the plurality of accounts of the user that are eligible to be associated with the virtual card;
receive from the digital wallet application on the mobile communication device, a first selection of two or more of the plurality of accounts and a first ruleset from the user via a first API call, wherein the API is provided by the system and creates a communication channel between the system, the digital wallet application and a digital wallet provider that manages the digital wallet application;
store an active association of the two or more of the plurality of accounts identified in the first selection and the virtual card along with the first ruleset as a first entry on the database, wherein the token is a proxy for the two or more of the plurality of accounts based on the active association;
receive an authorization request message associated with a first transaction including the token instead of identifiers for the two or more of the plurality of accounts;
identify the token in the authorization request message;
retrieve, from the database, the two or more of the plurality of accounts associated with the token;
process the first transaction using the two or more of the plurality of accounts identified in the first selection and the first ruleset, wherein the processing comprises:
  identifying two or more issuers associated with the two or more of the plurality of accounts based on an issuer identifier incorporated in each one of the identifiers for the two or more of the plurality of accounts;
  generating an issuer-specific authorization request message for each one of the two or more issuers;
  transmitting the issuer-specific authorization request message to each one of the two or more issuers associated with the two or more of the plurality of accounts;
  receiving an authorization response message from each of the two or more issuers in response to each issuer-specific authorization request message;
  aggregating authorization response messages from the two or more issuers into an aggregated authorization response message;
  transmitting the aggregated authorization response message to a resource provider;
receive a second API call from the digital wallet application on the mobile communication device requesting to add an additional account to be associated with the token in addition to the two or more of the plurality of accounts identified in the first selection, wherein the second API call includes at least (1) the token, and (2) an account identifier for the additional account, wherein the additional account was not included among the plurality of accounts of the user;
analyze the database to confirm that the token is a valid token; and
create, on the database, an additional active association from the token to the additional account,
  wherein the additional active association indicates that the token is to be the proxy for (1) the two or more of the plurality of accounts identified in the first selection, and (2) the additional account.

12. The system of claim 11, wherein the instructions, when executed by the one or more processors, further cause the one or more processors to:
receive a second selection of two or more of the plurality of accounts and a second ruleset from the user;
store an active association of the two or more of the plurality of accounts identified in the second selection and the virtual card along with the second ruleset as a second entry on the database;
receive an authorization request message associated with a second transaction including the virtual card;
identify properties of the second transaction;
determine that the second transaction is to be processed using the two or more of the plurality of accounts identified in the second selection and the second ruleset based on the properties of the second transaction; and
process the second transaction using the two or more of the plurality of accounts identified in the second selection and the second ruleset.

13. The system of claim 11, wherein the instructions, when executed by the one or more processors, further cause the one or more processors to:
identify properties of the first transaction; and
determine that the first transaction is to be processed using the two or more of the plurality of accounts identified in the first selection and the first ruleset based on the properties of the first transaction.

14. The system of claim 11, wherein at least two of the plurality of accounts are issued by two different issuers, wherein the instructions, when executed by the one or more processors, further cause the one or more processors to:
transmit a message to each issuer associated with the two or more of the plurality of accounts identified in the first selection informing each issuer of the passive association between the virtual card and an account among the plurality of accounts issued by the issuer.

15. The system of claim 11, wherein the first ruleset includes instructions to split an amount of the first transaction among the two or more of the plurality of accounts identified in the first selection according to a predetermined scheme.

16. The system of claim 11, wherein the instructions, when executed by the one or more processors, further cause the one or more processors to:
receive a decline authorization response message from the issuer of a given account;
receive a second selection of one or more of the plurality of accounts and a second ruleset from the user, wherein the second selection excludes the given account; and
continue processing the first transaction using the one or more of the plurality of accounts identified in the second selection and the second ruleset.

17. The system of claim 11, wherein the first transaction is an online transaction that is processed using the two or more of the plurality of accounts identified in the first selection.

* * * * *